United States Patent
Saxena et al.

(10) Patent No.: US 9,805,019 B2
(45) Date of Patent: Oct. 31, 2017

(54) SYSTEM AND METHOD FOR UNIVERSAL STRUCTURE PRESERVING DATA MASKING

(71) Applicant: Infosys Limited, Bangalore (IN)

(72) Inventors: Ashutosh Saxena, Hyderabad (IN); Shikha Gupta, New Delhi (IN); Upagupta Mandal, Pune (IN)

(73) Assignee: Infosys Limited, Bangalore (IN)

( * ) Notice: Subject to any disclaimer, the term of this patent is extended or adjusted under 35 U.S.C. 154(b) by 507 days.

(21) Appl. No.: 14/493,660

(22) Filed: Sep. 23, 2014

(65) Prior Publication Data

US 2015/0169540 A1    Jun. 18, 2015

(30) Foreign Application Priority Data

Dec. 17, 2013    (IN) .......................... 5879/CHE/2013

(51) Int. Cl.
G06F 17/30    (2006.01)
G06F 17/27    (2006.01)

(52) U.S. Cl.
CPC .... G06F 17/2705 (2013.01); G06F 17/30011 (2013.01); G06F 17/30017 (2013.01)

(58) Field of Classification Search
None
See application file for complete search history.

(56) References Cited

U.S. PATENT DOCUMENTS

| 7,917,770 | B2 | 3/2011 | Gopinath et al. |
| 8,306,932 | B2 | 11/2012 | Saxena et al. |
| 8,341,104 | B2 | 12/2012 | Manickam et al. |
| 8,347,398 | B1 | 1/2013 | Weber |
| 2004/0205618 | A1* | 10/2004 | Sini .................. G06F 17/30905 715/239 |
| 2007/0150964 | A1 | 6/2007 | Orthlieb et al. |
| 2008/0133934 | A1* | 6/2008 | Gopinath ............ G06F 11/3672 713/189 |

(Continued)

OTHER PUBLICATIONS

DMsuite™ Cloud Edition—SaaS Data Masking Software, http://www.axistechnologyllc.com/dmsuite-data-masking/dmsuite-cloud-edition, Archived Jul. 19, 2012, 2 pages.

(Continued)

Primary Examiner — Son T Hoang
(74) Attorney, Agent, or Firm — Klarquist Sparkman, LLP

(57) ABSTRACT

The described technologies can be used for masking one or more heterogeneous digital contents. One or more heterogeneous digital contents can be received from one or more data sources. Further, the received one or more heterogeneous digital contents can be parsed by a first parser unit to obtain a portable format data. The portable format data can be a homogeneous digital content arranged in one or more layers. Further, masking of the portable format data can be performed by a masking unit. A masking methodology can be applied based on selection of one or more rules from a plurality of rules to obtain a masked portable format data. Further, reverse-parsing of the masked portable format data can be performed by a second parser unit to obtain a masked data. Structure of the received one or more heterogeneous digital contents remains preserved.

16 Claims, 9 Drawing Sheets

(56) References Cited

U.S. PATENT DOCUMENTS

2009/0106031 A1* 4/2009 Jax .................. G10L 19/24
704/500
2011/0321120 A1 12/2011 Saxena et al.

OTHER PUBLICATIONS

DMSuite: Mask Data with Microsoft SQL Server, 2011, 2 pages.
"Cloud Data Masking," http://www.informaticacloud.com/products/cloud-test-data-management/data-masking, downloaded Sep. 22, 2014, 2 pages.
"Data Masking Best Practices," Oracle, Jun. 2013, http://www.oracle.com/us/products/database/data-masking-best-practices-161213.pdf, 26 pages.
"Masking the data on Cloud," International Journal of Advances in Computing and Information Technology, vol. 1, Issue 4, 2012, http://www.ijacit.com/articles/twelve/vol1issue4/1pages/jacitlp0101140006.html#.VCCbC3mUPcs, 6 pages.
Haldeman, "Compare IBM data masking solutions: InfoSphere Optim and DataStage," http://www.ibm.com/developerworks/data/library/techarticle/dm-1211maskingsolution/index.html, Nov. 15, 2012, 11 pages.

\* cited by examiner

SYSTEM AND METHOD FOR UNIVERSAL STRUCTURE PRESERVING DATA MASKING

FIELD OF TECHNOLOGY

This disclosure relates generally to the technical field of data masking and, more specifically to a method and/or a system for masking one or more heterogeneous digital contents.

BACKGROUND

With increased business transactions occurring electronically, every year organizations are forced to retain a growing volume of sensitive data. The ease at which data can be collected automatically, stored in databases and queried efficiently over the Internet has paradoxically worsened the overall privacy situation. The privacy situation has raised numerous ethical and legal concerns.

Problems arising from private data falling into malicious hands may include identity theft, stalking on web and spam. Legislation like HIPAA and PIPEDA has now made it legally mandatory for all service providers in the United States of America to ensure privacy and security of data entrusted with the service providers. Violations of the legislation may attract a heavy penalty. Also, loss of trust from customers stands as a looming danger if such a security breach occurs.

Earlier data masking had to be performed by buying dedicated licenses and/or entire product suites. The licenses and/or the product suits come with a huge cache of data masking options. Not all of the data masking options may be needed by a customer for immediate requirement.

A worldwide movement towards data privacy legislation has increased pressure on organizations to improve their information privacy and security standards. Data privacy research indicates that more than 70% of all security incidents come from internal threats. Moreover, data breaches coming from inside and associated costs of such internal breaches are more than 50 times as costly when compared with external breaches.

Thus, there is a need to provide technological solutions to achieve privacy keeping a tradeoff between data privacy and data utility. Techniques are required for publishing data while preserving right balance between individual privacy and data utility. Some techniques for data privacy are Anonymization, Randomization, Perturbation, Privacy Policy Languages and Data Masking.

The process whereby information in a database shall be masked and/or 'de-identified' may be referred to as data masking. Data masking enables creation of realistic data in non-production environments. This avoids risk of exposing sensitive information to unauthorized users. Data masking ensures protection of the sensitive information from a multitude of threats posed both outside and inside the perimeter of an organization.

Among available variety of software tools, solutions and systems implementing data masking techniques, most of them have some major drawbacks.

Standalone utilities are tightly integrated with other processes. Regular updates and/or bug fixes become cumbersome. Moreover the existing products work only on specific formats. Thus, making them restrictive to a type of data and an underlying environment. For vendors, a standalone data masking product also presents piracy concerns, deployment concerns such as creation of installers and integration concerns.

Versioning issues are present in case of the standalone data masking product. A new version may not be compatible with existing OS and hardware. A new release also needs to be tested for integration with all possible services the standalone data masking product caters. Manufacturing and distribution cost are also present in case of the standalone data masking product.

Existing products may be OS/platform/language dependent and non-reversible while changing original look and feel of the data, thus making usage limited for a particular environment.

SUMMARY

A universal structure preserving data masking method and system is disclosed. In one aspect, a method includes masking one or more heterogeneous digital contents in a data processing system. The one or more heterogeneous digital contents are received from one or more data sources. The received one or more heterogeneous digital contents are stored in a temporary computer database. A first parser unit associated with one or more processors is configured for parsing the received one or more heterogeneous digital contents to obtain a portable format data. The portable format data is a homogeneous digital content arranged in one or more layers. A masking unit associated with the one or more processors is configured to mask the portable format data. Masking is performed by selecting at least one rule from a plurality of rules stored in the temporary computer database. A masking methodology is applied based on the selected one or more rules to obtain a masked portable format data. A second parser unit associated with the one or more processors is configured for reverse-parsing the masked portable format data to obtain a masked data. Structure of the received one or more heterogeneous digital contents is thereby preserved.

The heterogeneous digital content includes at least one of a string, a text, an image, a video and an audio. The portable format data includes one of a string, a text, an image, a video and an audio arranged in one or more layers. The portable format data may be platform independent. The user may create a new rule if existing rules in the temporary computer database may not be able to satisfy user requirements. The new rule may be stored in the temporary computer database.

In another aspect, a system for masking one or more heterogeneous digital contents is disclosed. The system includes one or more processors; and a temporary computer database configured for receiving the one or more heterogeneous digital contents from one or more data sources and storing the received one or more heterogeneous digital contents. The system further includes a first parser unit, associated with the one or more processors, for parsing the received one or more heterogeneous digital contents to obtain a portable format data. The portable format data is a homogeneous digital content arranged in one or more layers. A masking unit is associated with the one or more processors, for masking the portable format data. Masking is performed by selecting at least one rule from a plurality of rules in the temporary computer database. A masking methodology is applied based on the selected one or more rules to obtain a masked portable format data. The system further includes a second parser unit, associated with the one or more processors, for reverse-parsing the masked portable format data to obtain a masked data. Structure of the received one or more heterogeneous digital contents remains preserved.

In a further aspect a computer program product comprising a non-transitory computer usable medium having a computer readable program code embodied therein for masking one or more heterogeneous digital contents in a data processing system is disclosed. The computer program product includes receiving the one or more heterogeneous digital contents from one or more data sources. The received one or more heterogeneous digital contents are stored in a temporary computer database. A first parser unit associated with one or more processors is configured for parsing the received one or more heterogeneous digital contents to obtain a portable format data. The portable format data is a homogeneous digital content arranged in one or more layers. A masking unit associated with the one or more processors is configured to mask the portable format data. Masking is performed by selecting at least one rule from a plurality of rules stored in the temporary computer database. A masking methodology is applied based on the selected one or more rules to obtain a masked portable format data. A second parser unit associated with the one or more processors is configured for reverse-parsing the masked portable format data to obtain a masked data. Structure of the received one or more heterogeneous digital contents remains preserved.

The methods, systems, and apparatuses disclosed herein may be implemented in any means for achieving various aspects, and may be executed in a form of a machine/readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Data privacy while retaining data structure along with extensibility for user needs method and system is disclosed.

In the following description, for the purposes of explanation, numerous specific details are set forth in order to provide a thorough understanding of the various embodiments. It will be evident, however to one skilled in the art that the various embodiments may be practiced without these specific details.

In various embodiments of the present invention, data structure may be retained. Only one deployment may cater multiple needs arising from different platforms and operating systems by several end users and applications simultaneously.

An example embodiment provides a system and method for masking one or more heterogeneous digital contents while preserving structure of the one or more heterogeneous digital contents. A temporary computer database may be configured for storing one or more heterogeneous digital contents received from one or more data sources. A parser unit associated with one or more processors may further be configured to parse the received one or more heterogeneous digital contents to obtain a portable format data. The portable format data may be a homogeneous digital content arranged in one or more layers. The portable format data may be passed through a universal data masking system. The universal data masking system internally applies a masking methodology on the portable format data based on one of the rules selected by a user from a rule engine to obtain a masked portable format data. Masking may be performed based on user acceptance. If the existing rules from the rule engine does not satisfy user requirement, combinations of rules are applied and as per user acceptance, the newly accepted rule may be added to the existing rule engine. Also, the user may add one or more rules to the rule engine if desired. Further, the masked portable format data, so generated, may be parsed back by a second parser unit associated with the one or more processors to obtain a masked data thereby preserving structure of the received one or more heterogeneous digital contents.

Figure 1A:
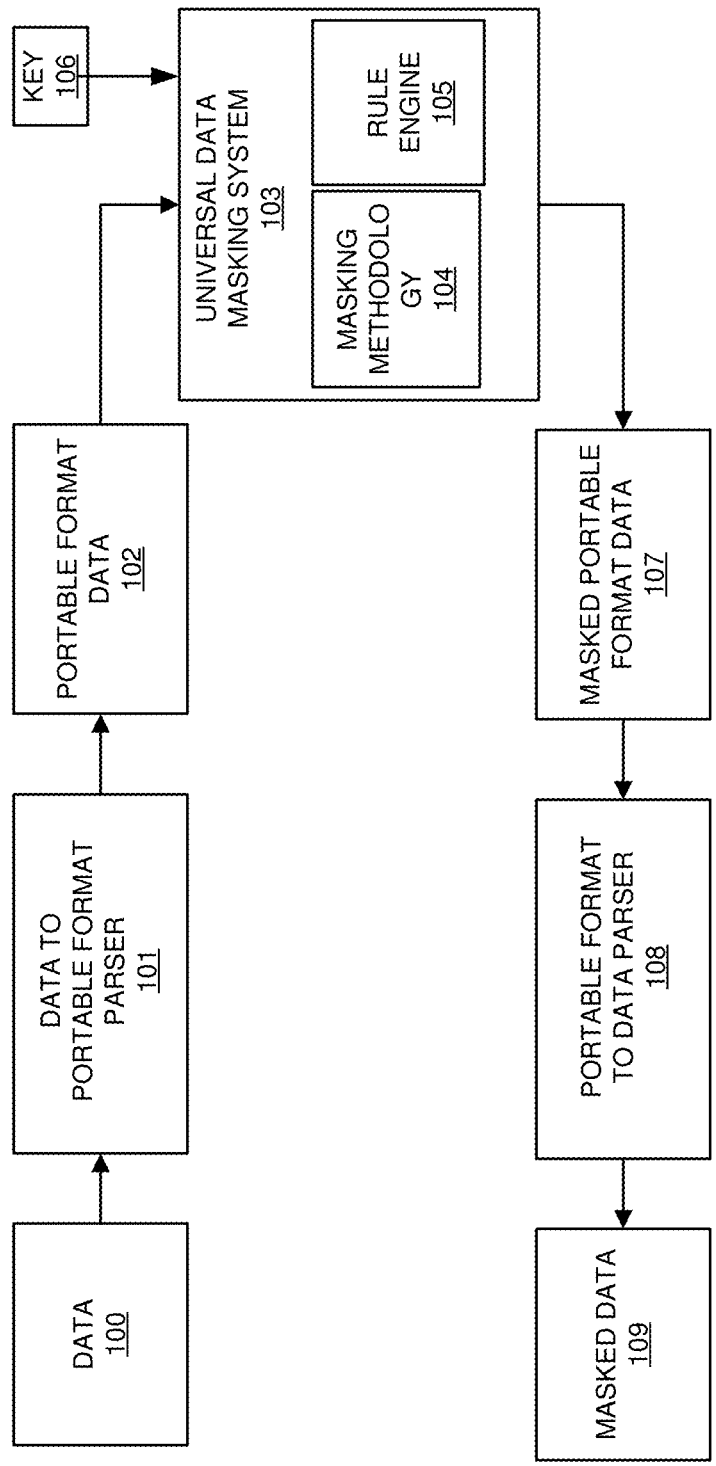
FIG. 1A is an architectural block diagram of data masking system, according to one embodiment.

FIG. 1A is an architectural block diagram of a data masking system according to one embodiment. FIG. 1A illustrates that data 100 may be received from various data sources. The data sources may include a web interface, an API, a command line and a SOA. The data 100 may include one or more heterogeneous digital contents. The heterogeneous digital contents include various types of data that include, but not limited to, one or more of a string, a text, an image, a video file and an audio file. The heterogeneous digital contents may be stored in the temporary computer database. The temporary computer database may not be durable. The temporary computer database may be a cache and/or a memory.

Masking operation starts with the portable format parser 101 converting the received input data 100 of any data type to the portable format data 102. The portable format parser 101 segregates the one or more heterogeneous digital contents in one or more layers to convert the input data 100 of any type to the portable format data 102. A structure of the portable format data 102 may be stored in one of the layers. The portable format data may be a homogeneous digital content.

In an example embodiment, the data 100 consists of a string, a text, an image, a video file and an audio file. The portable format parser 101 converts the data 100 in the portable format data 102. The portable format data 102 may be arranged in several layers. A first layer consists information about the structure of the portable format data 102, a second layer consists the string, a third layer consists the text, a fourth layer consists the image, a fifth layer consists a video file and a sixth layer consists an audio file.

Figure 1B:
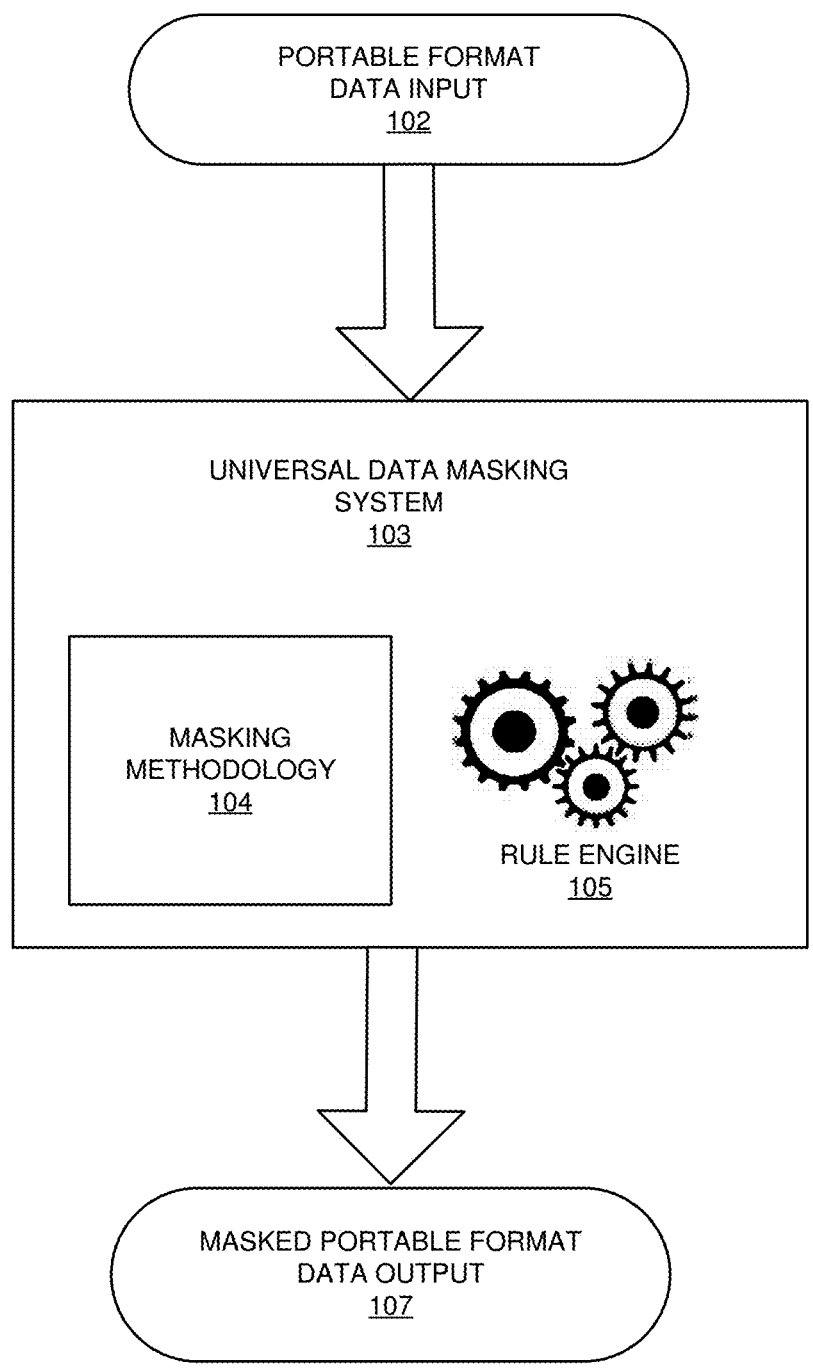
FIG. 1B is a block diagram of universal data masking system (UDM) comprising masking methodology and rule engine of FIG. 1A, according to one embodiment.

FIG. 1B is a block diagram of universal data masking system (UDM) comprising masking methodology and rule engine of FIG. 1A, according to one embodiment. The portable format data 102 may be passed to the universal data masking system 103. The universal data masking system 103 internally applies the masking methodology 104 on the portable format data 102, based on at least one rule from the plurality of rules stored in the rule engine 105. The portable format data 102 converts into the masked portable format data 107.

Masking may be performed based on user acceptance. If the existing rules from the rule engine 105 does not satisfy user requirement, combinations of rules may be applied. As per user acceptance, the newly accepted rule may be added to the existing rule engine. Also, a user may add a new rule to the rule engine 105 if desired. The rules are applied in an adaptive manner.

FIG. 1A further illustrates that the masked portable format data 107, so generated, may be reverse-parsed by the second portable format parser 108 to obtain the masked data 109 for user consumption. The masked data 109 may have the structure similar to the structure of the data 100.

Additionally, the overall masking process may be reversible or non-reversible in nature. If the overall masking process seems reversible, then the process may be referred to as a reversible data masking system. The reversible data masking system requires a secret key 106 to be used in an encryption and a decryption process. There may generally be no need of the secret key 106 in a non-reversible masking system. The reversible data masking system may also be used as a non-reversible masking system by simply destroying the key 106 after masking the data.

Figure 2:
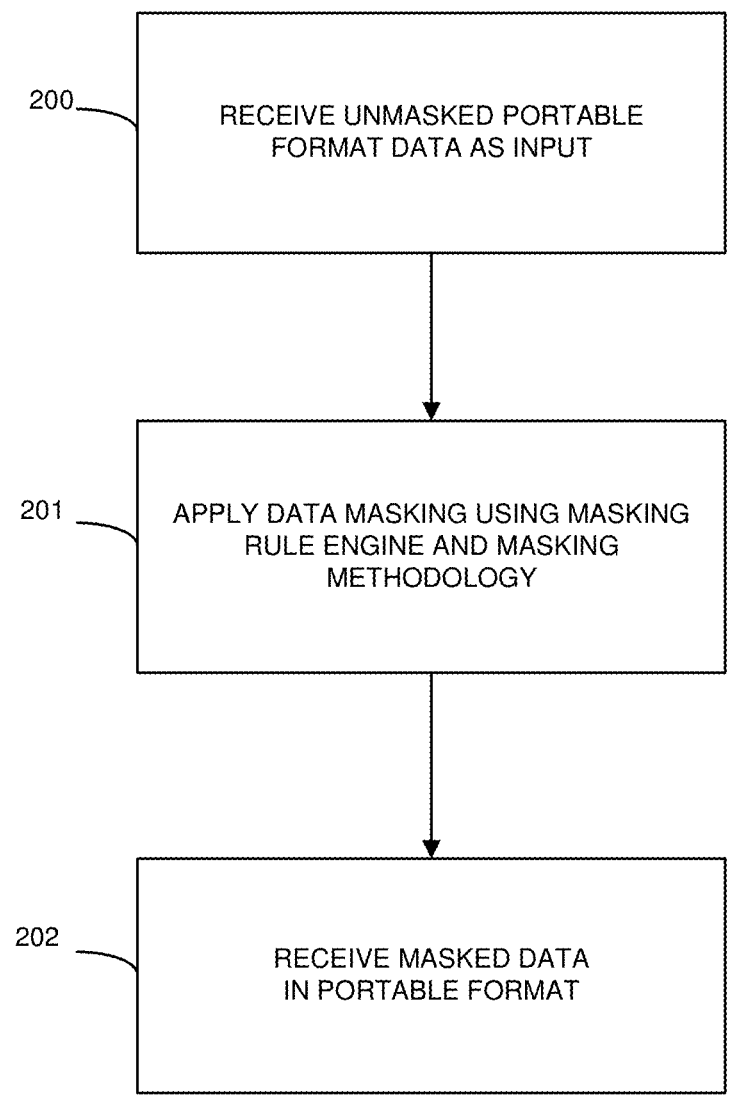
FIG. 2 is a process flow of UDM comprising masking methodology and rule engine of FIG. 1B, according to one embodiment.

FIG. 2 is a process flow of UDM comprising masking methodology and rule engine of FIG. 1B, according to one embodiment. At operation 200, the unmasked portable format data may be received as the input data. The unmasked portable format data may be in the form of the homogeneous digital content which includes, but not limited to one of a string, a text, an image, a video file and an audio file arranged in one or more layers. At operation 201, one or more masking rules are applied (e.g., by a data masking rule engine) to the unmasked portable format data. The unmasked portable format data may be masked based on the masking methodology. At operation 202, the masked data in portable format may be received as the output.

Figure 3:
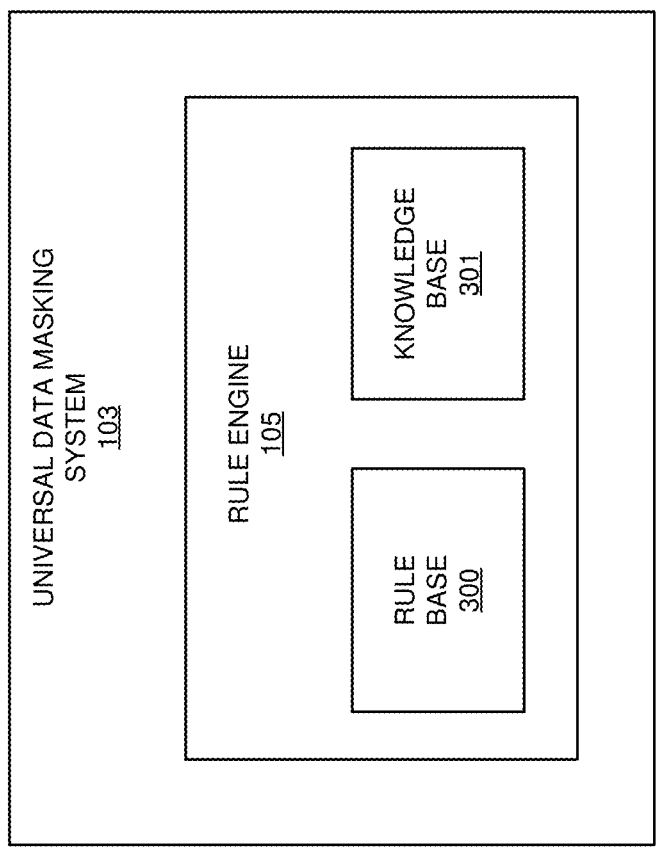
FIG. 3 is a block diagram of UDM showing components of rule engine of FIG. 1b, according to one embodiment.

FIG. 3 is a block diagram of UDM showing components of rule engine of FIG. 1B, according to one embodiment. The rule engine 105 contains a rule base 300 and a knowledge base 301. The rule base 300 contains the rules to be applied to the data. The knowledge base 301 contains criteria for applying the rules to the data.

For example, the rule base 300 may contain rules such as a string must be masked to a string, no rule, static substitution, dataset substitution, random substitution, encryption, shuffling, and the like. The knowledge base 301 may contain criteria about which part of document, what rule should be applied.

Figure 4:
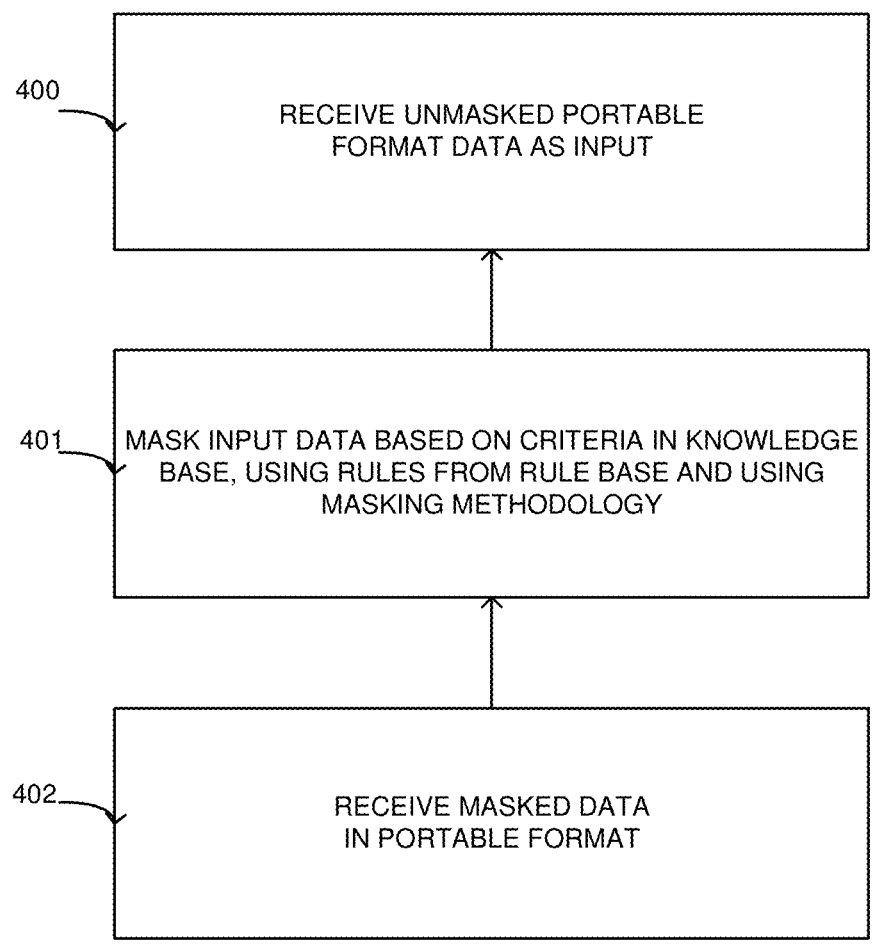
FIG. 4 is a process flow of UDM showing components of rule engine of FIG. 3, according to one embodiment.

FIG. 4 is a process flow of UDM showing components of rule engine of FIG. 3, according to one embodiment. At operation 400, the unmasked portable format data may be received at the universal data masking system as an input. The unmasked portable format data may be in the form of the homogeneous digital content. At operation 401, the unmasked portable format data may be masked based on one or more criteria in the knowledge base, using rules from the rule base and using the masking methodology. At operation 402, the masked data in the portable format may be received as an output.

Figure 5:
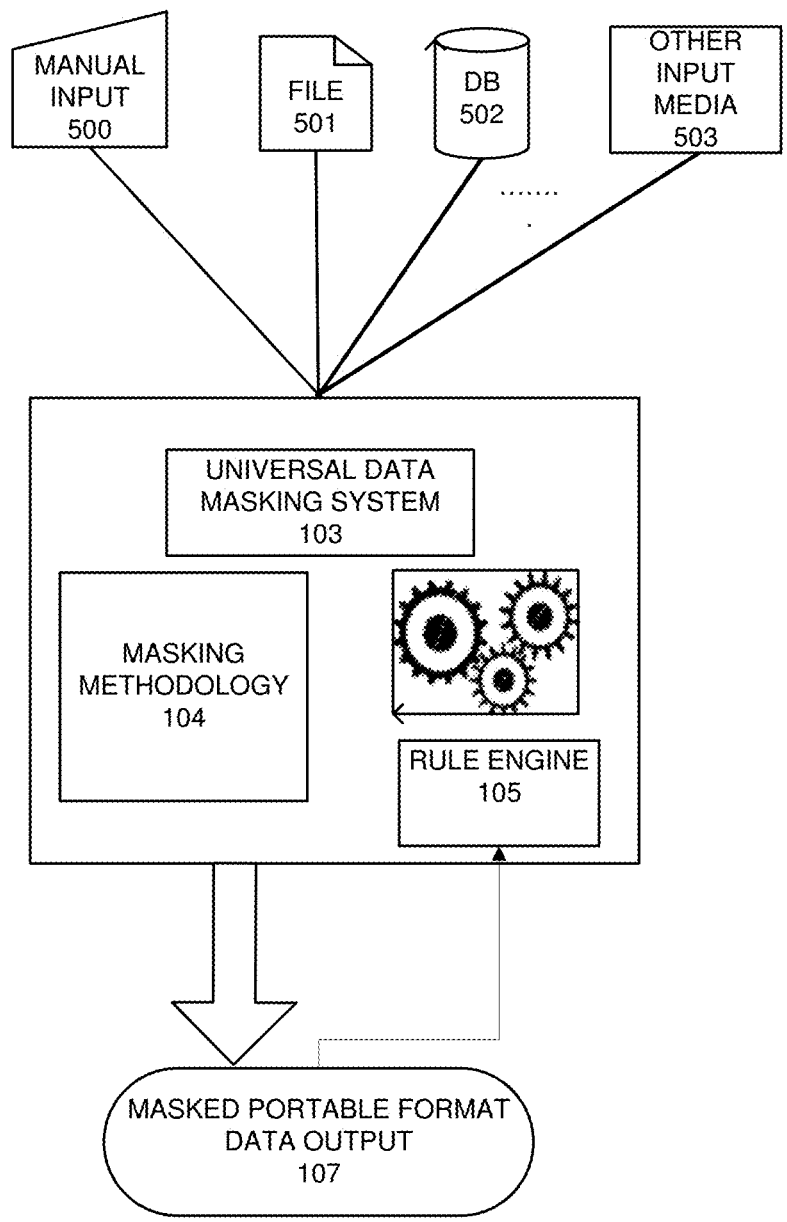
FIG. 5 is a block diagram for UDM with varied inputs, according to one embodiment.

FIG. 5 is a block diagram that depicts various ways in which the portable format data may be sent as the input to the universal data masking system, according to one embodiment. The ways include, but not limited to, manual data input by a user 500, through files 501, from database 502, and any other media 503. The input data to the universal data masking system 103 may be the portable format data 102. The portable format data 102 may be the homogeneous digital content arranged in the one or more layers. The portable format data 102 may be passed to the universal data masking system 103. The universal data masking system 103 internally applies masking methodology 104 on the data, based on the rules in the rule engine 105. The masked portable format data 107 may be received.

Figure 6:
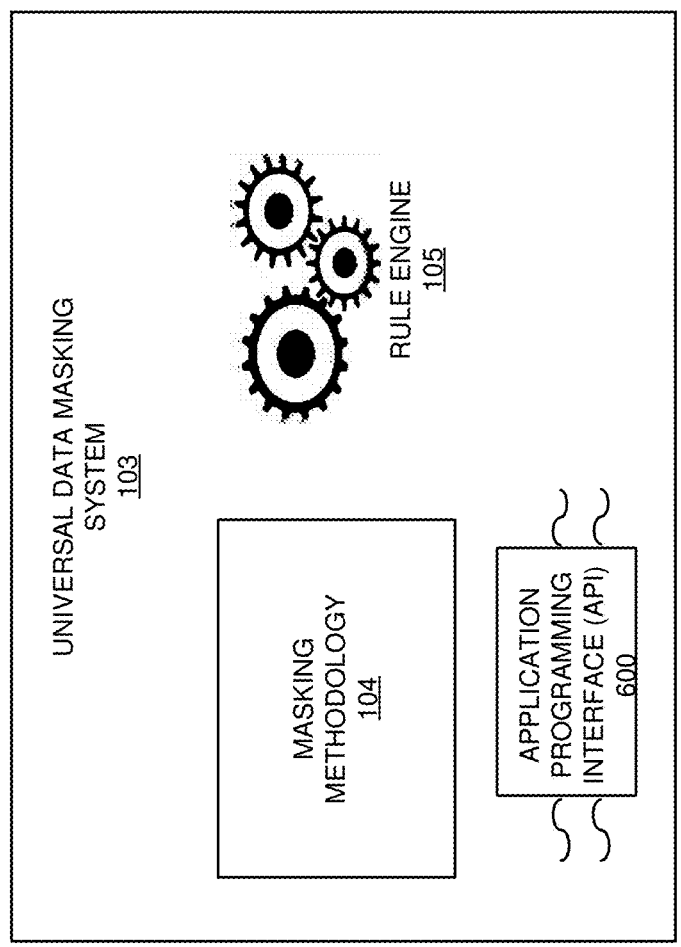
FIG. 6 is a block diagram of UDM comprising masking methodology and rule engine of FIG. 1B exposed as an application interface, according to one embodiment.

FIG. 6 is a block diagram of UDM comprising masking methodology and rule engine of FIG. 1B exposed as an application programming interface (API) 600, according to one embodiment. The UDM exposed as the API facilitates application developers to use the API in an application for masking any type of data.

Figure 7:
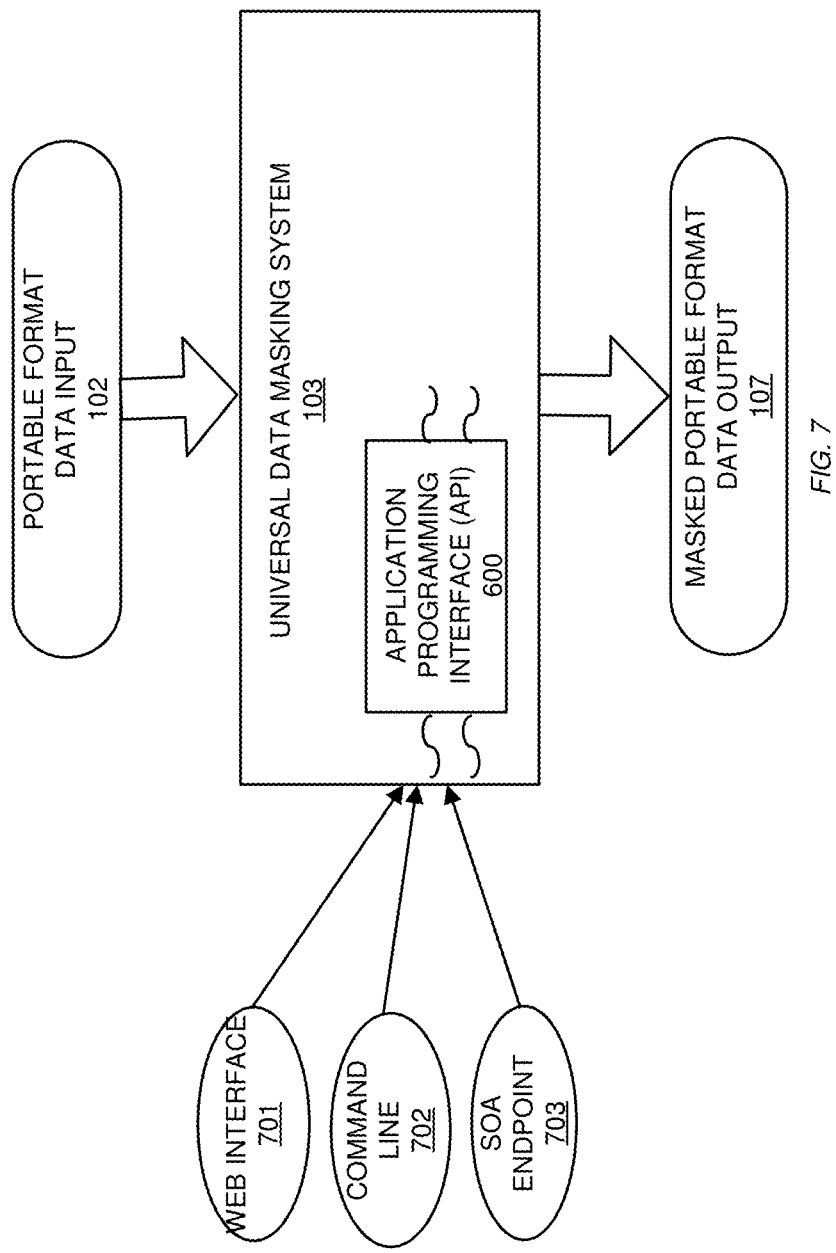
FIG. 7 is a block diagram of UDM of FIG. 1B showing various interfaces to interact with the application interface exposed, according to one embodiment.

FIG. 7 is a block diagram of UDM of FIG. 1B showing various interfaces to interact with the application programming interface (API) exposed, according to one embodiment. The FIG. 7 shows the API 600 of the universal data masking system 103 such as that shown in FIG. 1. The API 600 exposes the universal data masking system 103 as a masking utility to several applications. The various interfaces include, but not limited to a web interface 701, a command line 702 and a SOA endpoint 703.

For example, a web application may access the masking utility through a web interface 701. In such scenario, the portable format data 102 to be masked may be sent from the web interface 701 to the universal data masking system 103 via the exposed API 600. In the similar manner, the masked portable format data 107 so generated may be returned back to several web applications. The web interface 701 includes, but not limited to, HTTP and FTP based on size and the structure of the portable format data 102.

The API 600 may also be accessed through a command line 703. In such scenario, a command given at the command line 702 for masking the portable format data 102 may be sent from personal computers or laptops.

The API 600 may also be invoked from a Service Oriented Architecture (SOA) endpoint 704. For example, the portable format data 102 may be masked through a web service without installing a data masking software at a local machine).

Figure 8:
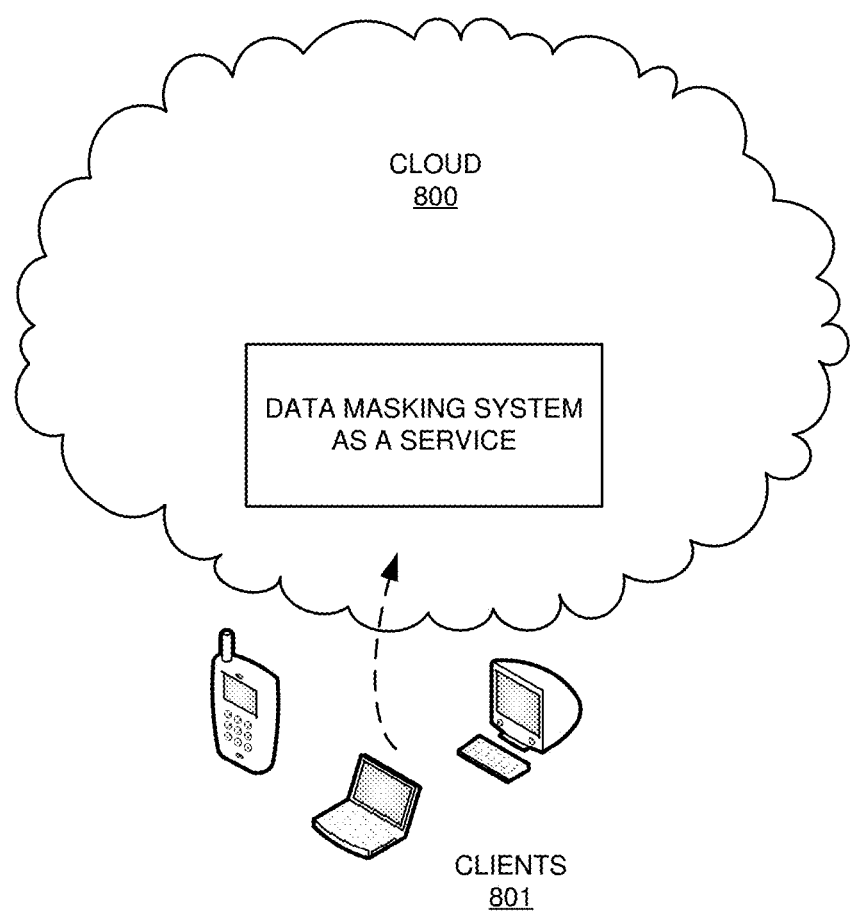
FIG. 8 is a schematic view of UDM of FIG. 1B as a cloud service, according to one embodiment.

FIG. 8 is a schematic view of UDM of FIG. 1B as a cloud service, according to one embodiment. The data masking system may be hosted as a service on a cloud 800. The data masking system may be extensively used by various cloud users on pay per use basis. An application may access the data masking system as a service hosted on the cloud 800. When the service is requested, an agent, which is an instance of the data masking system, is sent to the client machine 801. The agent performs the data masking on a sensitive data at a client side and hence performs the masking utility. In this scenario, the advantages of the cloud 800 are also added to the data masking system.

Hosting the service on the cloud 800 provides huge capability of computation and storage. This results in better performance with lower costs, particularly when number of users increases significantly. Hosting the service on the cloud 800 also guarantees data sharing, security and isolation among various service users.

In addition, it will be appreciated that the various operations, processes, and methods disclosed herein may be embodied in a machine-readable medium and/or a machine accessible medium compatible with a data processing system (e.g., a computer system), and may be performed in any order. The modules in the figures are shown as distinct and communicating with only a few specific module and not others. The modules may be merged with each other, may perform overlapping functions, and may communicate with other modules not shown to be connected in the Figures. Accordingly, the specification and drawings are to be regarded in an illustrative rather than a restrictive sense.

What is claimed is:

1. A method for masking at least one digital contents in a data processing system, the method comprising:
   receiving, the at least one digital contents from one or more data sources and storing the received at least one digital contents in a temporary computer database, wherein the received at least one digital contents comprises a plurality of data types;
   parsing, by a first parser unit, associated with one or more processors, the received at least one digital contents to obtain portable format data by segregating the received at least one digital contents by the plurality of data types into separate digital content items arranged in a plurality of layers in the portable format data, the layers being associated with respective different data types;
   masking, by a masking unit, associated with the one or more processors, the portable format data by:
      for a first layer of the portable format data, selecting a first rule corresponding to a first masking methodology applied to a first data type,
      for a second layer of the portable format data, selecting a second rule corresponding to a second masking methodology applied to a second data type, the first and second rules being selected from a plurality of rules, and
      applying the first masking methodology to the first layer and the second masking methodology to the second layer based on the selected first and second rules to obtain masked portable format data; and
   reverse-parsing, by a second parser unit, associated with the one or more processors, the masked portable format data to obtain masked data by reversing the segregating of the plurality of digital items in the masked portable format data, and preserving structure of the received at least one digital contents in the masked data.

2. The method according to claim 1, wherein the portable format data is platform independent.

3. The method according to claim 1, further comprising: creating a new rule by a user; and storing the new rule in the temporary computer database.

4. The method of claim 1, wherein the one or more data sources comprise a web interface, an API, a command line, or an SOA.

5. The method of claim 1, wherein structure of the portable format data is stored in one of the plurality of layers.

6. The method of claim 1, further comprising: returning the masked data to at least one web application.

7. A data processing system for masking a plurality of discrete digital contents, the system comprising:
   one or more hardware processors in operable communication with one or more processor-readable storage medium, the one or more processor-readable storage medium containing one or more programming instructions, wherein the one or more hardware processors is configured to implement:
   a temporary computer database, associated with the one or more hardware processors, for receiving the plurality of discrete digital contents from one or more data sources and storing the received plurality of discrete digital contents, wherein the received plurality of discrete digital contents comprises a structure and a plurality of data types;
   a first parser unit, associated with the one or more hardware processors, for parsing the received plurality of discrete digital contents to obtain portable format data by segregating the plurality of discrete digital contents into two or more separate layers of the portable format data, the two or more separate layers comprise respective different data types;
   a masking unit, associated with the one or more hardware processors, for masking individually the two or more separate layers of the portable format data by selecting at least one rule specific to the layer applied to a corresponding data type from a plurality of stored rules and applying a masking methodology based on the selected at least one rule to the two or more separate layers to obtain masked portable format data; and
   a second parser unit, associated with the one or more hardware processors, for reverse-parsing the masked portable format data to obtain masked data by reversing the segregating of the two or more separate layers of the masked portable format data to reconstruct the structure of the plurality of discrete digital contents.

8. The system according to claim 7, wherein the portable format data is platform independent.

9. The system according to claim 7, further comprising:
   a user input component in communication with the one or more hardware processors, the user input component adapted to:
      create a new rule by a user; and store the new rule in the temporary computer database.

10. The data processing system of claim 7, wherein the one or more data sources comprise a web interface, an API, a command line, or an SOA.

11. The data processing system of claim 7, wherein structure of the portable format data is stored in one of the one or more separate layers.

12. The data processing system of claim 7, wherein the at least one rule is selected for the portable format data based on criteria that determine a rule to be applied to a layer of the two or more separate layers.

13. A computer program product comprising a non-transitory computer usable medium having a computer readable program code embodied therein for masking a plurality of digital contents in a data processing system, the computer program code causing a computing system to perform a method comprising:
   receiving, the at least one digital contents from one or more data sources and storing the received at least one digital contents in a temporary computer database, wherein the received at least one digital contents comprises a plurality of data types;
   parsing, by a first parser unit, associated with one or more processors, the received at least one digital contents to obtain portable format data by segregating the received at least one digital contents by the plurality of data types into separate digital content items arranged in a plurality of layers in the portable format data, the layers being associated with respective different data types;

masking, by a masking unit, associated with the one or more processors, the portable format data by:
  for a first layer of the portable format data, selecting a first rule corresponding to a first masking methodology applied to a first data type,
  for a second layer of the portable format data, selecting a second rule corresponding to a second masking methodology applied to a second data type, the first and second rules being selected from a plurality of rules, and
  applying the first masking methodology to the first layer and the second masking methodology to the second layer based on the selected first and second rules to obtain masked portable format data; and
reverse-parsing, by a second parser unit, associated with the one or more processors, the masked portable format data to obtain masked data by reversing the segregating of the plurality of digital items in the masked portable format data, and preserving structure of the received at least one digital contents in the masked data.

14. The computer program product according to claim 13, wherein the portable format data is platform independent.

15. The computer program product according to claim 13, wherein the one or more data sources comprise a web interface, an API, a command line, or an SOA.

16. The computer program product according to claim 13, wherein a structure of the portable format data is stored in one of the layers.

* * * * *